United States Patent
Fu

(10) Patent No.: US 10,793,680 B2
(45) Date of Patent: Oct. 6, 2020

(54) BRIDGED SILICONE RESIN, FILM, ELECTRONIC DEVICE AND RELATED METHODS

(71) Applicant: DOW SILICONES CORPORATION, Midland, MI (US)

(72) Inventor: Peng-Fei Fu, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/336,759

(22) PCT Filed: Sep. 29, 2017

(86) PCT No.: PCT/US2017/054435
§ 371 (c)(1),
(2) Date: Mar. 26, 2019

(87) PCT Pub. No.: WO2018/064543
PCT Pub. Date: Apr. 5, 2018

(65) Prior Publication Data
US 2020/0172679 A1 Jun. 4, 2020

Related U.S. Application Data

(60) Provisional application No. 62/402,282, filed on Sep. 30, 2016.

(51) Int. Cl.
| | | |
|---|---|---|
| C08G 77/52 | (2006.01) | |
| C08G 77/12 | (2006.01) | |
| C08J 5/18 | (2006.01) | |
| H01B 3/46 | (2006.01) | |
| C09D 183/14 | (2006.01) | |
| C08G 77/00 | (2006.01) | |

(52) U.S. Cl.
CPC ............ *C08G 77/52* (2013.01); *C08G 77/80* (2013.01); *C08J 5/18* (2013.01); *C09D 183/14* (2013.01); *H01B 3/46* (2013.01); *C08G 77/12* (2013.01)

(58) Field of Classification Search
CPC ......... C08G 77/12; C08G 77/52; C08G 77/80
See application file for complete search history.

(56) References Cited

U.S. PATENT DOCUMENTS

| 4,233,427 A | 11/1980 | Bargain et al. |
|---|---|---|
| 5,378,790 A | 1/1995 | Michalczyk et al. |
| 5,691,433 A | 11/1997 | Kotani et al. |
| 6,252,030 B1 | 6/2001 | Zank et al. |
| 6,368,535 B1* | 4/2002 | Katsoulis ............... C08G 77/50 264/236 |
| 6,764,718 B2* | 7/2004 | Nakamura ............... H01B 3/46 427/387 |
| 7,019,100 B2 | 3/2006 | Tabei et al. |
| 8,025,927 B2 | 9/2011 | Fu et al. |
| 2002/0143132 A1* | 10/2002 | Kobayashi ........... C09D 183/14 528/10 |
| 2004/0214966 A1 | 10/2004 | Tabei et al. |
| 2010/0267913 A1 | 10/2010 | Kolel-Veetil et al. |
| 2010/0279025 A1 | 11/2010 | Fu et al. |
| 2012/0270998 A1* | 10/2012 | Koh ........................ C08G 77/20 524/588 |
| 2013/0029843 A1* | 1/2013 | Edmiston ............. B01J 20/2803 502/401 |
| 2014/0377957 A1* | 12/2014 | Takeda ................ H01L 21/3081 438/703 |
| 2015/0218427 A1 | 8/2015 | Ono et al. |

FOREIGN PATENT DOCUMENTS

| JP | 2004339482 A | 12/2004 |
|---|---|---|
| JP | 2007051152 A | 3/2007 |
| JP | 2011516626 A | 5/2011 |
| JP | 2013057031 A | 3/2013 |
| JP | 2014205823 A | 10/2014 |
| KR | 20100114075 A | 10/2010 |
| KR | 20160006657 A | 1/2016 |
| WO | 2009111196 A1 | 9/2009 |

OTHER PUBLICATIONS

International Search Report for International Application No. PCT/US2017/054435 dated Dec. 12, 2017, 4 pages.
Machine assisted English translation of JP2013057031A obtained from https://patents.google.com/patent on Mar. 19, 2020, 21 pages.
Machine assisted English translation of JP2014205823A obtained from https://patents.google.com/patent on Mar. 19, 2020, 10 pages.

\* cited by examiner

*Primary Examiner* — Marc S Zimmer
(74) *Attorney, Agent, or Firm* — Warner Norcross + Judd LLP

(57) ABSTRACT

A bridged silicone resin is disclosed which has the general formula (1): $(HSiO_{3/2})_x(SiO_{3/2}-X-SiO_{3/2})_y$ (1); wherein x and y are each from >0 to <1 such that x+y=1; and wherein X is divalent group comprising a silarylene group or a $-(CH_2)_{q'}SiRR^1[O(SiRR^1O)_n]SiRR^1-(CH_2)_{q}-$ group, where n is an integer from 1 to 10, each R and $R^1$ is an independently selected substituted or unsubstituted hydrocarbyl group, and q and q' are each independently integers selected from 0 or from 1 to 6. Various methods relating to the bridged silicone resin and end uses thereof are also disclosed.

14 Claims, No Drawings

BRIDGED SILICONE RESIN, FILM, ELECTRONIC DEVICE AND RELATED METHODS

CROSS-REFERENCE TO RELATED APPLICATIONS

This application is the National Stage of International Application No. PCT/US2017/054435 filed on Sep. 29, 2017, which claims priority to and all advantages of U.S. Provisional Patent Application No. 62/402,282 filed on Sep. 30, 2016, the content of which is hereby incorporated by reference.

FIELD OF THE INVENTION

The present invention generally relates to a silicone resin and, more specifically, to a bridged silicone resin which forms films having excellent physical properties and to related methods, films, and electronic devices.

DESCRIPTION OF THE RELATED ART

Silicone resins are known in the art and utilized in various end use applications. Silicone resins typically include three-dimensional networks attributable to the presence of T siloxy units ($R^0SiO_{3/2}$) and/or Q siloxy units ($SiO_{4/2}$), where $R^0$ is a substituent. Properties of silicone resins differ depending on, among other things, their cross-link densities and molar fractions of siloxy units. Increasing the cross-link density generally results in a silicone resin having greater hardness and/or rigidity. Silica, or glass, comprises Q siloxy units.

T resins, or silsesquioxanes, are often utilized for spin-on-glass (SOG) applications, whereby the T resins are applied on a substrate, spun into a layer, and annealed to give spin-on-glass (SOG) films. SOG films are desirable in that they may be formed from T resins in liquid form, e.g. in a solvent, and subsequently annealed to give the SOG films having properties similar to glass. Dielectric properties of the SOG films allows for many end use applications, particularly in the electronics industry.

However, unlike glass, SOG films are often brittle and suffer from cracking at elevated temperatures. This may be particularly problematic at certain SOG film thicknesses. Thus, thermal stability and resistance to cracking limits potential end use applications of SOG films and the T resins suitable for preparing such SOG films.

SUMMARY OF THE INVENTION

The present invention provides a bridged silicone resin. The bridged silicone resin has the general formula (1):

wherein x and y are each from >0 to <1 such that x+y=1; and wherein X is divalent group comprising a silarylene group or a —$(CH_2)_qSiRR^1[O(SiRR^1O)_n]SiRR^1—(CH_2)_{q'}$— group, where n is an integer from 1 to 10, each R and $R^1$ is an independently selected substituted or unsubstituted hydrocarbyl group, and q and q' are each independently integers selected from 0 or from 1 to 6.

A method of preparing the bridged silicone resin is also disclosed. This method comprises reacting an initial silicone resin and a bridging compound to give the bridged silicone resin. The initial silicone resin has the general formula $(HSiO_{3/2})_{n'}$; where n' is 1. The bridging compound has the general formula (4):

$$R^3—Z'—R^3 \qquad (4);$$

wherein each $R^3$ independently is a functional group reactive with the silicon-bonded hydrogen atoms of the initial silicone resin, and Z' comprises an arylene group or a siloxane moiety.

The present invention also provides a method of forming a film with the bridged silicone resin. This method comprises applying the bridged silicone resin to a substrate. This method further comprises forming the film from the bridged silicone resin on the substrate. The film formed in accordance with this method is further provided by the present invention.

In addition, the present invention provides an electronic device. The electronic device comprises an electronic component, and the film formed from the bridged silicone resin disposed adjacent the electronic component.

Finally, the present invention provides a method of insulating the electronic device. This method comprises powering the electronic device such that the electronic component has an elevated temperature of from greater than 20° C. to 1,000° C. The film insulates the electronic component and exhibits substantial resistance to cracking at the elevated temperature.

DETAILED DESCRIPTION OF THE INVENTION

The present invention provides a bridged silicone resin and a method of preparing the bridged silicone resin. The bridged silicone resin has excellent properties and is suited for numerous end-use applications. For example, the bridged silicone resin forms a film having excellent properties, including dielectric properties, substantial crack resistance at elevated temperatures and thermal stability. Thus, the present invention also provides a method of forming a film with the bridged silicone resin and the film formed thereby. In view of the excellent physical properties of the film, an electronic device and a method of insulating the electronic device are further provided. However, end-use applications of the bridged silicone resin are not limited to films or electronic devices. For example, the bridged silicone resin may be utilized as a component in a composition (e.g. an adhesive, a cosmetic, etc.), may be utilized to form articles other than films, etc.

The bridged silicone resin has the general formula (1):

wherein x and y are each from >0 to <1 such that x+y=1; and wherein X is divalent group comprising a silarylene group, or a —$(CH_2)_qSiRR^1[O(SiRR^1)_n]SiRR^1—(CH_2)_{q'}$— group, where n is an integer from 1 to 10, each R and $R^1$ is an independently selected substituted or unsubstituted hydrocarbyl group, and q and q' are each independently integers selected from 0 or from 1 to 6.

Subscripts x and y are mole fractions and are independently selected from >0 to <1 such that the x+y=1. In certain embodiments, x is from 0.5 to <1, alternatively from 0.6 to <1, alternatively from 0.7 to <1, alternatively from 0.8 to <1. In these or other embodiments, y is from >0 to 0.5, alternatively from >0 to 0.4, alternatively from >0 to 0.3, alternatively from >0 to 0.2. However, in other embodiments, y may be greater than x such that the specific example ranges above are inverted.

X is divalent group. In a first embodiment, X comprises a silarylene group. The silarylene group may be any divalent group including at least one silicon-bonded arylene group. In certain embodiments, the arylene group is bonded between two silicon atoms in X. Specific examples of X, including when X is the silarylene group, are below.

In a second embodiment, X is a —$(CH_2)_q SiRR^1[O(SiRR^1O)_n]SiRR^1$—$(CH_2)_{q'}$— group, where n is an integer from 1 to 10, each R and $R^1$ is an independently selected substituted or unsubstituted hydrocarbyl group, and q and q' are each independently integers selected from 0 or from 1 to 6. In this second embodiment, X may be referred to as a divalent siloxane. In contrast, in the first embodiment introduced above for X, X as the silarylene group typically does not include siloxane (Si—O—Si) bonds.

Each R and each $R^1$ are independent selected and may be the same as or different from one another. Any description herein relating to R also applies independently to $R^1$ and vice versa. R and each $R^1$ may independently be linear, branched, and/or cyclic. Cyclic hydrocarbyl groups encompass aryl groups as well as saturated or non-conjugated cyclic groups. Aryl groups may be monocyclic or polycyclic. Linear and branched hydrocarbyl groups may independently be saturated or unsaturated. For example, linear hydrocarbyl groups include alkyl groups, alkenyl groups, alkynyl groups, etc. One example of a combination of a linear and cyclic hydrocarbyl group is an aralkyl group. By "substituted," it is meant that one or more hydrogen atoms may be replaced with atoms other than hydrogen (e.g. a halogen atom, such as chlorine, fluorine, bromine, etc.), or a carbon atom within the chain of R and/or $R^1$ may be replaced with an atom other than carbon, i.e., R and/or $R^1$ may include one or more heteroatoms within the chain, such as oxygen, sulfur, nitrogen, etc.

Typically, the hydrocarbyl groups of each R and $R^1$ independently comprise alkyl or aryl groups. Alkyl groups typically have from 1 to 30 carbon atoms, alternatively 1 to 24 carbon atoms, alternatively 1 to 20 carbon atoms, alternatively 1 to 12 carbon atoms, alternatively 1 to 10 carbon atoms, alternatively 1 to 6 carbon atoms, alternatively 1 to 4 carbon atoms, alternatively 1 to 3 carbon atoms, alternatively 1 or 2 carbon atoms, alternatively are methyl groups. Aryl groups typically have from 5 to 9 carbon atoms, alternatively 6 to 7 carbon atoms, and alternatively 5 to 6 carbon atoms.

In the second embodiment of X above, the bridged silicone resin has the general formula:

$(HSiO_{3/2})_x(SiO_{3/2}$—$(CH_2)_q SiRR^1[O(SiRR^1O)_n]SiRR^1$—$(CH_2)_{q'}$—$SiO_{3/2})_y$, where x, q, R, $R^1$, n, q' and y are defined above. In certain embodiments, q and q' are each 0. This is typically the case when the bridged silicone resin is prepared via a condensation reaction. In other embodiments, q and q' are each 2. This is typically the case when the bridged silicone resin is prepared via a hydrosilylation reaction. In the latter embodiments, each of q and q' may independently be greater than 2, e.g. 6. 2 is typical for q and q' when the hydrosilylation reaction involves silicon-bonded vinyl groups, which become the optional divalent groups indicated by q and q', respectively. The hydrosilylation reaction may involve silicon-bonded groups other than vinyl groups, e.g. silicon-bonded hexenyl groups, in which case q and q' are other than 2.

Although two embodiments of X are introduced above, the bridged silicone resin may include siloxy units having different and independently selected divalent groups represented by X. Said differently, the bridged silicone resin may include combinations of the two embodiments introduced above.

In the first embodiment of X introduced above, X comprises the silarylene group. One specific example of X comprising the silarylene group is below in general formula (2):

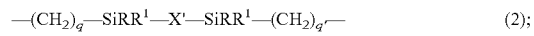  (2);

wherein q and q' are each independently selected and defined above; R and $R^1$ are independently selected and defined above; and X' is a divalent linking group comprising an arylene group. In the embodiment of general formula (2), the arylene group (designated by X') is bonded directly between two adjacent silicon atoms in the respective $SiRR^1$ blocks. As such, X' may be an arylene group itself such that general formula (2) represents a silarylene group, or X' may be a silarylene group such that X' itself includes silicon atoms in addition to those in the $SiRR^1$ blocks opposite X.

In general formula (2) above, the arylene group designated by X' may be any arylene group. Typically, X' is an arylene group such that X is a silarylene group, but X' itself does not constitute a silarylene group. In these embodiments, X still comprises a silarylene group, but X' merely comprises an arylene group. Alternatively, X' and X may each comprise a silarylene group.

When X' comprises the arylene group (but not the silarylene group), one specific example of X' is set forth in general formula (3):

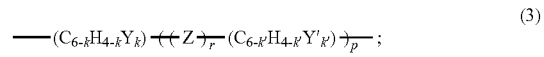  (3)

wherein p is an integer selected from 0 or from 1 to 3, r is 0 or 1, k and each k' are independently integers selected from 0 or from 1 to 4, Y and each Y' are independently selected from N, O, and S, and each Z is independently selected from O, S, $SiR^2_2$, CO, $CR^2_2$, $SO_2$, $PO_2$ and $NR^2$, where each $R^2$ is independently H or a substituted or unsubstituted hydrocarbyl group. Examples of substituted and unsubstituted hydrocarbyl groups are set forth above with respect to R and $R^1$.

In the embodiment of X' above, Y and Y', which are indicated by k and k', respectively, are optional heteroatoms that may be part of the respective aromatic structures in general formula (3). Typically, k and k' are each 0 such that the optional heteroatoms represented by Y and Y', respectively, are absent.

Z, indicated by subscript r, is an optional heteroatom or moiety present between adjacent aromatic structures. Subscript r is independently selected such that when the block indicated by subscript p is greater than 0, each repeating block may or may not include Z, and Z is independently selected in any instance in which it is present.

When r is 0, p is 0, and k' is 0, X' has the general formula —$(C_6H_4)$—. In this specific embodiment, X has the general formula —$(CH_2)_q$—$SiRR^1$—$(C_6H_4)$—$SiRR^1$—$(CH_2)_{q'}$—, where q, R, $R^1$, q' are defined above. In certain embodiments, q and q' are each 2. X', or —$(C_6H_4)$—, is bonded between silicon atoms. These bonds may be at any location of —$(C_6H_4)$—, i.e., at the ortho, meta, and/or para location.

In other embodiments, r is 0 and p is 1. When k and k' are each 0, X' has in this embodiment the general formula: —$(C_6H_4)$—$(C_6H_4)$—, and X has the general formula —$(CH_2)_q$—$SiRR^1$—$(C_6H_4)$—$(C_6H_4)$—$SiRR^1$—$(CH_2)_{q'}$—, where q, R, $R^1$, q' are defined above. In certain embodiments, q and q' are each 2. X', or —$(C_6H_4)$—$(C_6H_4)$—, is bonded between silicon atoms. These bonds may be at any location of each —$(C_6H_4)$—, i.e., at the ortho, meta, and/or para location.

In yet other embodiments, r is 1 and p is 1. When k and k' are each 0, X' may have, for example, any of the structures below depending on a selection of Z:

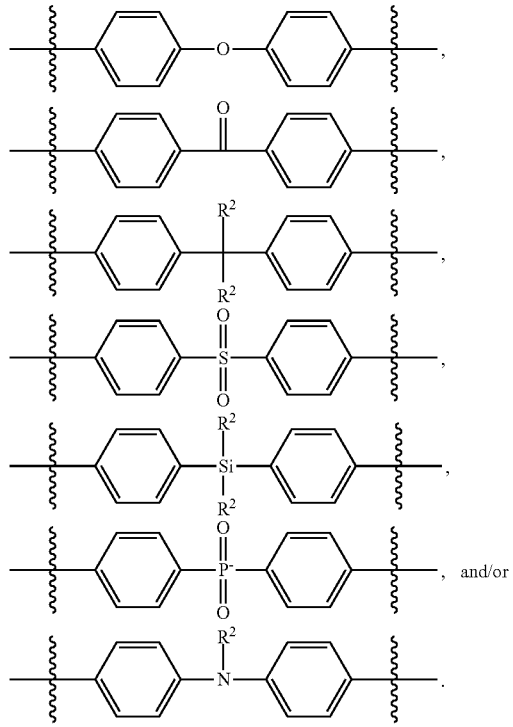

$R^2$ is defined above and independently is H or a substituted or unsubstituted hydrocarbyl group. These are merely exemplary examples of suitable species for X'.

For the specific examples provided above for X', X has the following corresponding structures (presented in the order in which exemplary examples of X' are introduced above):

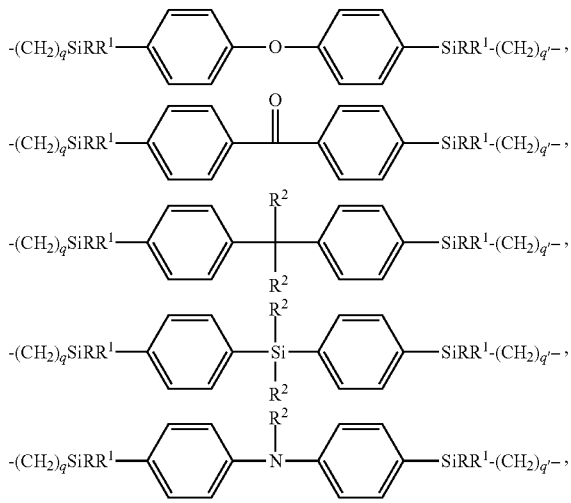

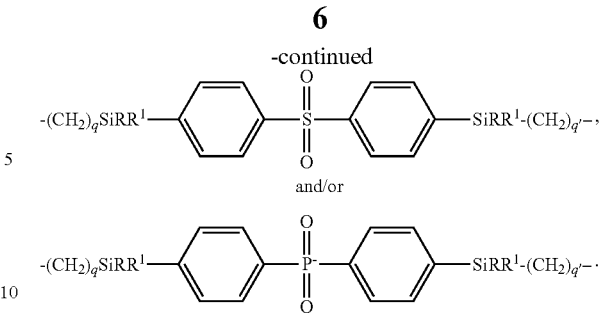

Alternatively still, in other embodiments, r is 1 and p is >1, i.e., p is 2 or 3. In these embodiments, Z may independently be present or absent from each block indicated by p, and may be independently selected if present in two or more blocks indicated by p.

In various embodiments, the bridged silicone resin has a weight average molecular weight ($M_W$) of from 100 to 5,000, alternatively from 115 to 4,000; alternatively from 130 to 1,000, as measured by gel permeation chromatography techniques (GPC) calibrated based on polystyrene standards.

As introduced above, a method of preparing the bridged silicone resin is also disclosed (the "preparation method"). The preparation method comprises reacting an initial silicone resin and a bridging compound to give the bridged silicone resin.

The initial silicone resin has the general formula $(HSiO_{3/2})_{n'}$, where n' is 1. The initial silicone resin is a hydrogen silsesquioxane resin (HSQ), which is a resin comprising, alternatively consisting essentially of, alternatively consisting of, T siloxy units. Hydrogen silsesquioxane resins, and methods of their preparation, are known in the art.

Typically, the initial silicone resin typically has a weight average molecular weight ($M_W$) of from 1,500 to 100,000, alternatively from 2,000 to 50,000, alternatively from 3,000 to 30,000, as measured by gel permeation chromatography techniques (GPC) calibrated based on polystyrene standards.

The initial silicone resin may be disposed in a vehicle, alternatively a solvent, when preparing the bridged silicone resin. The vehicle may be any vehicle for carrying the initial silicone resin, alternatively at least partially solubilizing the initial silicone resin, alternatively solubilizing the initial silicone resin.

Examples of suitable vehicles include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; alcohols such as methanol, ethanol, isopropanol, butanol, or n-propanol; ketones such as methyl isobutyl ketone (MIBK); glycol ethers such as propylene glycol methyl ether, dipropylene glycol methyl ether, propylene glycol n-butyl ether, propylene glycol n-propyl ether, propylene glycol methyl ether acetate (PGMEA), or ethylene glycol n-butyl ether; halogenated alkanes such as trichloroethane, dichloromethane, 1,1,1-trichloroethane, methylene chloride or chloroform; dimethyl sulfoxide; dimethyl formamide; acetonitrile; white spirits; mineral spirits; naphtha; and halogenated aromatic hydrocarbons such as bromobenzene and chlorobenzene. Combinations of different vehicles may also be utilized.

When the initial silicone resin is disposed in the vehicle, the relative amounts of the vehicle and the initial silicone resin may vary. Typically, the relative amounts are chosen based on a desired viscosity or flowability of a mixture of the initial silicone resin and the vehicle. In certain embodiments, the mixture comprises the initial silicone resin in an amount of from greater than 0 to 50, alternatively from 2.5 to 47.5, alternatively from 5 to 42.5, alternatively from 7.5 to 40, alternatively from 10 to 30, weight percent based on the total weight of the mixture. In these embodiments, the balance of the mixture typically is the vehicle.

In certain embodiments, the bridging compound has the general formula (4):

$$R^3—Z'—R^3 \quad (4);$$

wherein each $R^3$ independently is a functional group reactive with the silicon-bonded hydrogen atoms of the initial silicone resin, and Z' comprises an arylene group or a siloxane moiety. Typically, each $R^3$ is silicon-bonded in the bridging component, i.e., Z' includes silicon atoms to which each $R^3$ is bonded. The bridging compound forms X in the bridged silicone resin after reacting with the initial silicone resin.

The relative amounts of the initial silicone resin and the bridging compound depends on the selection of these components and the desired ratio of silicon-bonded hydrogen atoms in the initial silicone resin to $R^3$ functional groups in the bridging compound, as well as the desired structure of the bridged silicone resin. The molar ratio of silicon-bonded hydrogen atoms in the initial silicone resin to $R^3$ functional groups in the bridging compound may range, for example, from 40:1 to 1:1, alternatively from 20:1 to 2:1, alternatively from 10:1 to 5:1.

In specific embodiments, Z' has the general formula (5):

$$—SiRR^1—X'—SiRR^1— \quad (5);$$

wherein each R and $R^1$ is independently selected and defined above, and X' is defined above.

$R^3$ is reactive with the silicon-bonded hydrogen atoms of the initial silicone resin. In certain embodiments, $R^3$ includes an ethylenically unsaturated group. The unsaturated group is typically terminal in $R^3$. In such embodiments, $R^3$ may independently be an alkenyl group and/or an alkynyl group. When $R^3$ includes the ethylenically unsaturated group, the reaction between the bridging compound and the initial silicone resin is a hydrosilylation reaction.

When each $R^3$ of the bridging compound is a vinyl group, and when Z' comprises the arylene group, exemplary examples of suitable bridging compounds which generally correspond to the exemplary examples of X above for the bridged silicone resin are below (in the same order as presented above):

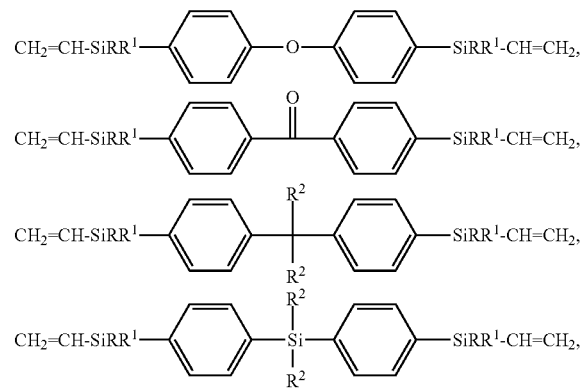

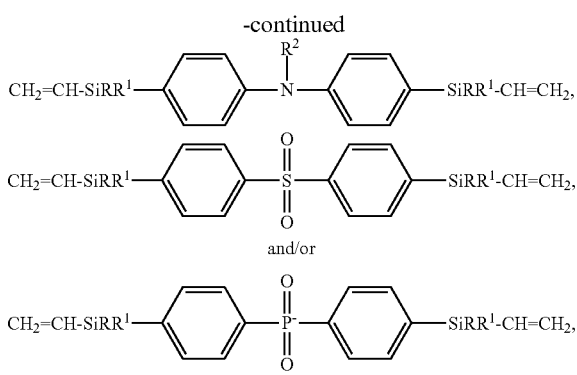

where R and $R^1$ are defined above.

In the exemplary examples above, each $R^3$ is silicon-bonded vinyl. In these exemplary examples, Z' of the bridging compound comprises as the arylene compound a silarylene compound, as in general formula (5) above. However, general formula could be represented different with the silicon atoms attributable to each $R^3$ and not to Z' such that Z' is an arylene compound and each $R^3$ is, in these specific embodiments, —$SiRR^1$—CH=$CH_2$. Moreover, the arylene groups above could be replaced with siloxane moieties, and/or the vinyl groups above could be replaced with hydroxyl groups.

When X of the bridged silicone resin is —$(CH_2)_q SiRR^1[O(SiRR^1O)_n]SiRR^1$—$(CH_2)_{q'}$—, one specific example of the bridged compound when q and q' are each 2 is $CH_2$=CH—$SiRR^1[O(SiRR^1O)_n]SiRR^1$—CH=$CH_2$, with n being defined above. This corresponds to q and q' each being 2. In this embodiment, $R^3$ is again silicon-bonded vinyl, and Z' is the siloxane moiety, in this case, $SiRR^1[O(SiRR^1O)_n]SiRR^1$.

The hydrosilylation reaction between the bridging compound and the initial silicone resin typically takes place in the presence of a hydrosilylation catalyst, which can be any of the well-known hydrosilylation catalysts comprising a platinum group metal or a compound containing a platinum group metal.

By platinum group metal it is meant ruthenium, rhodium, palladium, osmium, iridium and platinum as well as any complexes thereof. Typically, the platinum group metal is platinum, based on its high activity in hydrosilylation reactions. Platinum group metal-containing catalysts useful for the hydrosilylation catalyst include the platinum complexes prepared as described by Willing, U.S. Pat. No. 3,419,593, and Brown et al, U.S. Pat. No. 5,175,325, each of which is hereby incorporated by reference to show such complexes and their preparation. Other examples of useful platinum group metal-containing catalysts can be found in Lee et al., U.S. Pat. No. 3,989,668; Chang et al., U.S. Pat. No. 5,036,117; Ashby, U.S. Pat. No. 3,159,601; Larnoreaux, U.S. Pat. No. 3,220,972; Chalk et al., U.S. Pat. No. 3,296,291; Modic, U.S. Pat. No. 3,516,946; Karstedt, U.S. Pat. No. 3,814,730; and Chandra et al., U.S. Pat. No. 3,928,629 all of which are hereby incorporated by reference to show useful platinum group metal-containing catalysts and methods for their preparation. The platinum group-containing catalyst can be platinum group metal, platinum group metal deposited on a carrier such as silica gel or powdered charcoal, or a compound or complex of a platinum group metal. Specific examples of platinum-containing catalysts include chloroplatinic acid, either in hexahydrate form or anhydrous form, and or a platinum-containing catalyst which is obtained by a method comprising reacting chloroplatinic acid with an aliphatically unsaturated organosilicon compound such as divinyltetramethyldisiloxane, or alkene-platinum-silyl complexes as described in Roy, U.S. Pat. No. 6,605,734. These alkene-platinum-silyl complexes may be prepared, for example by mixing 0.015 mole (COD)PtCl$_2$ with 0.045 mole COD and 0.0612 moles HMeSiCl$_2$.

The hydrosilylation catalyst can also be a supported hydrosilylation catalyst comprising a solid support having a platinum group metal on the surface thereof. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

The hydrosilylation catalyst may also or alternatively be a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm). The photoactivatable hydrosilylation catalyst can be any of the well-known hydrosilylation catalysts comprising a platinum group metal or a compound containing a platinum group metal. The platinum group metals include platinum, rhodium, ruthenium, palladium, osmium, and iridium. Typically, the platinum group metal is platinum, based on its high activity in hydrosilylation reactions. The suitability of particular photoactivatable hydrosilylation catalysts for use in the composition of the present invention can be readily determined by routine experimentation.

Specific examples of photoactivatable hydrosilylation catalysts suitable for purposes of the present invention include, but are not limited to, platinum(II) β-diketonate complexes such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), platinum (II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp) triethylplatinum, (chloro-Cp)trimethylplatinum, and (trimethylsilyl-Cp)trimethylplatinum, where Cp represents cyclopentadienyl; triazene oxide-transition metal complexes, such as Pt[C$_6$H$_5$NNNOCH$_3$]$_4$, Pt[p-CN—C$_6$H$_4$NNNOC$_6$H$_{11}$]$_4$, Pt[p-H$_3$COC$_6$H$_4$NNNOC$_6$H$_{11}$]$_4$, Pt[p-CH$_3$(CH$_2$)$_x$—C$_6$H$_4$NNNOCH$_3$]$_4$, 1,5-cyclooctadiene.Pt[p-CN—C$_6$H$_4$NNNOC$_6$H$_{11}$]$_2$, 1,5-cyclooctadiene.Pt [p-CH$_3$O—C$_6$H$_4$NNNOCH$_3$]$_2$, [(C$_6$H$_5$)$_3$P]$_3$Rh[p-CN—C$_6$H$_4$NNNOC$_6$H$_{11}$], and Pd[p-CH$_3$(CH$_2$)$_x$—C$_6$H$_4$NNNOCH$_3$]$_2$, where x is 1, 3, 5, 11, or 17; (η-diolefin) (σ-aryl)platinum complexes, such as (η$^4$-1,5-cyclooctadienyl)diphenylplatinum, η$^4$-1,3,5,7-cyclooctatetraenyl)diphenylplatinum, (η$^4$-2,5-norboradienyl)diphenylplatinum, (η$^4$-1,5-cyclooctadienyl) bis-(4-dimethylaminophenyl)platinum, (η$^4$-1,5-cyclooctadienyl)bis-(4-acetylphenyl)platinum, and (η$^4$-1,5-cyclooctadienyl)bis-(4-trifluormethylphenyl)platinum. Typically, the photoactivatable hydrosilylation catalyst is a Pt(II) β-diketonate complex and more typically the catalyst is platinum(II) bis(2,4-pentanedioate). The hydrosilylation catalyst can be a single photoactivatable hydrosilylation catalyst or a mixture comprising two or more different photoactivatable hydrosilylation catalysts.

The concentration of the hydrosilylation catalyst is sufficient to catalyze the hydrosilylation reaction between the bridging compound and the initial silicone resin. The concentration of the hydrosilylation catalyst typically provides from 0.1 to 1000 ppm of platinum group metal, alternatively from 0.5 to 100 ppm of platinum group metal, alternatively from 1 to 25 ppm of platinum group metal, based on the combined weight of the bridging compound and the initial silicone resin.

In these or other embodiments, R$^3$ includes a hydroxyl group, alternatively R$^3$ is a hydroxyl group. In these embodiments, the reaction between the bridging compound and the initial silicone resin is a condensation reaction.

In these embodiments, R$^3$ may initially be any hydrolysable group. The hydrolysable groups may first undergo hydrolysis in the presence of water to give the hydroxyl group, which subsequently condenses with the silicon-bonded hydrogen atoms of the initial silicone resin to give the bridged silicone resin (with water as a byproduct). In these embodiments, the bridged compound may undergo hydrolysis and subsequent condensation with the initial silicone resin.

Examples of hydrolysable groups when bonded to silicon include H, a halide group, an alkoxy group, an alkylamino group, a carboxy group, an alkyliminoxy group, an alkenyloxy, and an N-alkylamido group.

When X of the bridged silicone resin is —(CH$_2$)$_q$SiRR$^1$ [O(SiRR$^1$O)$_n$]SiRR$^1$—(CH$_2$)$_{q'}$—, one specific example of the bridged compound is OH—SiRR$^1$[O(SiRR$^1$O)$_n$] SiRR$^1$—OH, with n being defined above. This corresponds to q and q' each being 0. In this embodiment, R$^3$ is silicon-bonded hydroxyl, and Z' is the siloxane moiety, in this case, SiRR$^1$[O(SiRR$^1$O)$_n$]SiRR$^1$, where n is defined above.

The condensation reaction between the bridging compound and the initial silicone resin typically takes place in the presence of a catalyst, which can be any condensation catalyst.

Examples of suitable condensation catalyst include acids, such as carboxylic acids, e.g. formic acid, acetic acid, propionic acid, butyric acid, and/or valeric acid; bases; metal salts of organic acids, such as dibutyl tin dioctoate, iron stearate, and/or lead octoate; titanate esters, such as tetraisopropyl titanate and/or tetrabutyl titanate; chelate compounds, such as acetylacetonato titanium; transition metal catalysts, such as platinum-containing catalysts, including for example any of those introduced above as being suitable hydrosilylation catalysts; aminopropyltriethoxysilane, and the like. If utilized, the condensation catalyst are typically utilized in a catalytic amount, e.g. in amount of from greater than 0 to 5, alternatively 0.0001 to 1, alternatively 0.001 to 0.1, percent by weight, based on 100 parts by weight based on the combined weight of the bridging compound and the initial silicone resin.

When R$^3$ includes the ethylenically unsaturated group, subscripts q and q' are each typically at least 2 in X of the bridged silicone resin. When R$^3$ is a hydroxyl group, subscripts q and q' are each typically 0 in X of the bridged silicone resin.

The reaction to give the bridged silicone resin may be carried out at ambient conditions or at modified conditions. For example, the reaction may be carried out at elevated temperatures (e.g. from greater than ambient to 100° C.), under stirring/shear, under vacuum, under an inert atmosphere, etc. The bridged silicone resin is typically formed in a reaction mixture, and the preparation method may further comprise isolating the bridged silicone resin from the reaction mixture, e.g. by filtration.

One of skill in the art readily understands how to prepare such bridging compounds. As but one example, when X is —(CH$_2$)$_2$—Si(CH$_3$)$_2$—(C$_6$H$_4$)—O—(C$_6$H$_4$)—Si(CH$_3$)$_2$—(CH$_2$)$_2$—, the bridging compound may be formed in accordance with the following reaction mechanism:

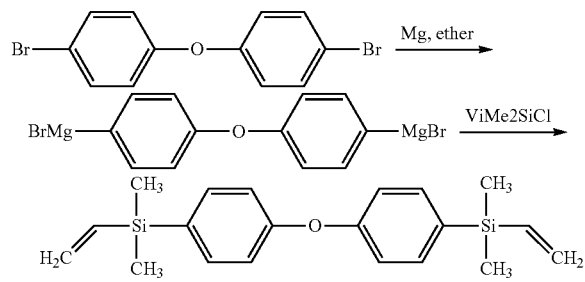

where Vi indicates a vinyl group and Me indicates a methyl group.

The initial silicone resin and the bridging compound may be reacted in various amounts or ratios depending on desired end properties of the bridged silicone resin. In certain embodiments, the bridging compound is utilized in an amount of from greater than 0 to 30, alternatively from greater than 0 to 20, alternatively from greater than 0 to 15, alternatively from greater than 0 to 10, weight percent based on the combined weight of the bridging compound and the initial silicone resin.

The present invention also provides a method of forming a film with the bridged silicone resin ("film preparation method"). The film preparation method comprises applying the bridged silicone resin to a substrate. The film preparation method further comprises forming the film from the bridged silicone resin on the substrate. Forming the film with the bridged silicone resin encompasses merely applying the bridged silicone resin on the substrate, drying, annealing, and whether or not there are any physical and/or chemical changes within the bridged silicone resin or the film.

In certain embodiments, applying the bridged silicone resin to the substrate comprises applying a silicone composition comprising the bridged silicone resin and a vehicle to the substrate. The vehicle may carry, alternatively partially solubilize, alternatively fully solubilize the bridged silicone resin. The vehicle generally reduces a viscosity of the silicone composition such that the silicone composition may be applied in wet form.

The vehicle may be any suitable vehicle. Examples of suitable vehicles include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; alcohols such as methanol, ethanol, isopropanol, butanol, or n-propanol; ketones such as methyl isobutyl ketone (MIBK); glycol ethers such as propylene glycol methyl ether, dipropylene glycol methyl ether, propylene glycol n-butyl ether, propylene glycol n-propyl ether, propylene glycol methyl ether acetate (PGMEA), or ethylene glycol n-butyl ether; halogenated alkanes such as trichloroethane, dichloromethane, 1,1,1-trichloroethane, methylene chloride or chloroform; dimethyl sulfoxide; dimethyl formamide; acetonitrile; white spirits; mineral spirits; naphtha; and halogenated aromatic hydrocarbons such as bromobenzene and chlorobenzene. Combinations of vehicles may also be utilized.

The relative amount of the bridged silicone resin in the silicone composition may vary. In various embodiments, the silicone composition comprises the bridged silicone resin in an amount of from 5 to 75 wt %, alternatively from 10 to 60 wt %, alternatively from 15 to 55 wt %, alternatively from 20 to 50 wt %, alternatively from 10 to 30 wt %, alternatively from 30 to 50 wt %, alternatively 12±2 wt %, alternatively 14±2 wt %, alternatively 16±2 wt %, alternatively 18±2 wt %, alternatively 20±2 wt %, alternatively 25±2 wt %, alternatively 30±2 wt %, alternatively 35±2 wt %, alternatively 40±2 wt %, alternatively 45±2 wt %, alternatively 50±2 wt %, alternatively 55±2 wt %, alternatively 60±2 wt %, alternatively 65±2 wt, all based on total weight of the silicone composition.

Applying the bridged silicone resin (itself or in the silicone composition) may comprise any suitable application technique. Typically, the silicone composition is applied in wet form via a wet coating technique. In certain embodiments, the bridged silicone resin is applied by i) spin coating; ii) brush coating; iii) drop coating; iv) spray coating; v) dip coating; vi) roll coating; vii) flow coating; viii) slot coating; ix) gravure coating; or x) a combination of any of i) to ix).

In specific embodiments, the bridged silicone resin is applied by spin coating. In these embodiments, the silicone composition is dispensed on a substrate, such as a device wafer (e.g., a semiconductor device wafer, e.g., a gallium arsenide wafer, a silicon (Si) wafer, a silicon carbide (SiC) wafer, a Si wafer having a SiO$_{x'}$ layer disposed thereon, or a Si wafer having a SiN layer disposed thereon) to give a wet deposit. Subscript x' is a rational or irrational number expressing the average number of oxygen atoms per one silicon atom in a silicon oxide layer. Typically, x' is from 1 to 4.

The wet deposit and substrate are then spin coated for a period of time to give a spinned layer. In spin-coating the wet deposit on the substrate, the spin-coating may be done at a maximum spin speed and for a spin time sufficient to obtain a desired thickness of the spinned layer. The maximum spin speed may be from 400 to 5,000, alternatively from 500 to 4,000, alternatively from 800 to 3,000, revolutions per minute (rpm).

In spin-coating the wet deposit on the wafer, the spin time may be from 0.5 seconds to 10 minutes. The spin time may be fixed, e.g., kept constant at from 30 seconds to 2 minutes, and a person of ordinary skill in the art using a conventional spin-coater apparatus may then readily adjust the spin speed to obtain a particular thickness.

In certain embodiments, the film preparation method further comprises annealing the spinned layer to form the film on the substrate. When the spinned layer is annealed, the film may be referred to as a spin-on-glass (SOG) layer or film. The spinned layer is typically wet. As such, the spinned layer may be heated prior to annealing, e.g. to drive any vehicle from the spinned layer prior to annealing the bridged silicone resin of the spinned layer to give the film.

Typically, the substrate has an integrated hot plate or an integrated or stand-alone furnace, which may be quartz-lined. The substrate and spinned layer are heated, e.g. over three hot plates in succession at temperatures of from 125 to 175° C., e.g. 150° C.; then from 175 to 225° C., e.g., 200° C.; and then from 325 to 375° C., e.g. 350° C., each for a period of time. The period of time may be from greater than 0 seconds to 10 minutes, alternatively about one minute. The heating step drives any vehicle from the silicone composition separate from the bridged silicone resin to give a dried film. The heating step also begins to initiate structural changes within the bridged silicone resin prior to final annealing. Ambient moisture and water may contribute to further hydrolysis and/or condensation of T units within the bridged silicone resin to give Q units. In certain embodiments, after the heating steps described above, the dried film may be exposed to ambient conditions and relative humidity.

The dried film then typically undergoes annealing at a temperature of from about 300 to 900, alternatively from 350 to 500, alternatively from 375 to 425° C. Generally, annealing takes place in an inert environment, e.g. under nitrogen. The Si—H bond dissociation due to oxidation typically occurs at temperatures greater than 360° C. However, at least some Si—H bonds generally remain even after annealing.

The film may be bonded to the substrate (physically and/or chemically) or the film may be peelable or otherwise removable from the substrate. The film may be physical bonded to the substrate and/or chemically bonded to the substrate.

In various embodiments, the film is subjected to further processing depending upon its end use application. For example, the film may be subjected to oxide deposition (e.g. $SiO_2$ deposition), resist deposition and patterning, etching, chemical or plasma stripping, metallization, or metal deposition. Such further processing techniques are generally known. Such deposition may be chemical vapor deposition (including low-pressure chemical vapor deposition, plasma-enhanced chemical vapor deposition, and plasma-assisted chemical vapor deposition), physical vapor deposition, or other vacuum deposition techniques. Many such further processing techniques involve elevated temperatures, particularly vacuum deposition, for which the film is well suited in view of its excellent thermal stability.

The film has a thickness that may vary depending upon its end use application. Typically, the film has a thickness of from greater than 0 to 10 micrometers (μm), alternatively from 1.5 to 10 micrometers (μm). However, other thicknesses are contemplated, e.g. from 0.1 to 200 μm. For example, the thickness of the film may be from 0.2 to 175 μm; alternatively from 0.5 to 150 μm; alternatively from 0.75 to 100 μm; alternatively from 1 to 75 μm; alternatively from 2 to 60 μm; alternatively from 3 to 50 μm; alternatively from 4 to 40 μm; alternatively any one of 1, 2, 3, 4, 5, 6, 7, 8, 9, 10, 15, 20, 25, 30, 35, 40, 45, 50, 60, 70, 75, 80, 90, 100, 150, 175, and 200 μm.

The film has excellent physical properties, particularly as compared to conventional spin-on-glass (SOG) films. For example, many conventional SOG films are brittle with poor thermal stability. However, the inventive film has substantial resistance to cracking and excellent thermal stability at elevated temperatures. For example, in certain embodiments, the film substantially resists cracking when heated to an elevated temperature of i) from 100 to 1000° C.; ii) from 400 to 850° C.; or iii) both i) and ii).

Substantial resistance to cracking, as used herein, means that when visually inspected under an optical and/or scanning electronic microscope, the films do not exhibit cracking at a thickness of 1.5 micrometers (μm) when heated at 500° C. for 60 minutes under nitrogen.

The film also has excellent thermal stability as well as etch selectivity for patterning (if the film undergoes further processing as introduced above).

The present invention also provides an electronic device. The electronic device comprises an electronic component, and the film disposed adjacent the electronic component. By "adjacent," it is meant that the film is disposed adjacent and in contact with, alternatively adjacent but separated from, the electronic component. The substrate on which the film is formed may be the electronic component of the electronic device.

The electronic device is not limited and may be referred to as a "microelectronic device" and/or an "electronic circuit." Exemplary examples thereof include silicon based devices, gallium arsenide devices, focal plane arrays, optoelectronic devices, photovoltaic cells, optical devices, dielectric layers, doped dielectric layers to produce transistor-like devices, pigment loaded binder systems containing silicon to produce capacitors and capacitor-like devices, multilayer devices, 3-D devices, silicon-on-insulator (SOI) devices, super lattice devices and the like.

The electrical component of the electronic device is typically a semiconducting component, alternatively a conducting component. The film has excellent dielectric properties and may insulate such semiconducting components from heat and/or electric current. However, the electrical component may be any component of the electrical device, which are well known. The heat may be attributable to an environment or ambient conditions in which the electrical device is utilized. Alternatively, the heat may be attributable to use and powering of the electronic device, which generally results in the generation of heat at least in various electrical components of the electrical device, particularly electrically conductive components thereof.

A method of insulating the electronic device is also provided. The method comprises powering the electronic device such that the electronic component has an elevated temperature of from greater than 20° C. to 1,000° C. The film insulates the electronic component and exhibits substantial resistance to cracking at the elevated temperature as described above. Because of the excellent dielectric properties of the film, insulation typically extends to insulation from heat at the elevated temperature and to insulation from electrical current when powering the electronic device.

Embodiment 1 relates to a bridged silicone resin having the general formula (1):

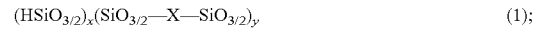

$$(HSiO_{3/2})_x(SiO_{3/2}-X-SiO_{3/2})_y \quad (1);$$

wherein x and y are each from >0 to <1 such that x+y=1; and wherein X is divalent group comprising a silarylene group, or a —$(CH_2)_q$SiRR$^1$[O(SiRR$^1$O)$_n$]SiRR$^1$—$(CH_2)_{q'}$— group, where n is an integer from 1 to 10, each R and R$^1$ is an independently selected substituted or unsubstituted hydrocarbyl group, and q and q' are each independently integers selected from 0 or from 1 to 6.

Embodiment 2 relates to the bridged silicone resin of Embodiment 1, wherein X has the general formula (2):

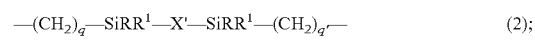

$$-(CH_2)_q-SiRR^1-X'-SiRR^1-(CH_2)_{q'}- \quad (2);$$

wherein q and q' are each independently selected and defined above; R and R$^1$ are independently selected and defined above; and X' is a divalent linking group comprising an arylene group.

Embodiment 3 relates to the bridged silicone resin of Embodiment 2, wherein X' has the general formula (3):

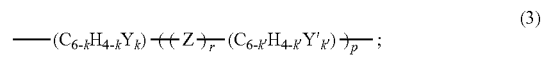

$$-(C_{6-k}H_{4-k}Y_k)-(Z)_r-(C_{6-k'}H_{4-k'}Y'_{k'})_p-; \quad (3)$$

wherein p is an integer selected from 0 or from 1 to 3, r is 0 or 1, k and each k' are independently integers selected from 0 or from 1 to 4, Y and each Y' are independently selected from N, O, and S, and each Z is independently selected from O, S, $SiR^2_2$, CO, $CR^2_2$, $SO_2$, $PO_2$ and $NR^2$, where each $R^2$ is independently H or a substituted or unsubstituted hydrocarbyl group.

Embodiment 4 relates to a method of preparing the bridged silicone resin of Embodiment 1. The method of Embodiment 4 comprises reacting an initial silicone resin and a bridging compound to give the bridged silicone resin;

wherein the initial silicone resin has the general formula $(HSiO_{3/2})_{n'}$, where n' is 1; and wherein the bridging compound has the general formula (4):

$$R^3\text{—}Z'\text{—}R^3 \quad (4);$$

wherein each $R^3$ independently is a functional group reactive with the silicon-bonded hydrogen atoms of the initial silicone resin, and Z' comprises an arylene group or a siloxane moiety.

Embodiment 5 relates to the method of Embodiment 4, wherein Z' has the general formula (5):

$$\text{—}SiRR^1\text{—}X'\text{—}SiRR^1\text{—} \quad (5);$$

wherein each R and $R^1$ is independently selected and defined above; and

X' is a divalent linking group having the general formula (3):

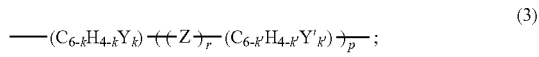

wherein p is an integer selected from 0 or from 1 to 3, r is 0 or 1, k and each k' are independently integers selected from 0 or from 1 to 4, Y and each Y' are independently selected from N, O, and S, and each Z is independently selected from O, S, $SiR^2_2$, CO, $CR^2_2$, $SO_2$, $PO_2$ and $NR^2$, where each $R^2$ is independently H or a substituted or unsubstituted hydrocarbyl group.

Embodiment 6 relates to the method of Embodiments 4 or 5, wherein reacting the initial silicone resin and the bridging compound comprises (i) a hydrosilylation reaction; (ii) a condensation reaction; or (iii) a combination of (i) and (ii).

Embodiment 7 relates to the method of any one of Embodiments 4-6, wherein the initial silicone resin and the bridging compound are reacted in the presence of a catalyst.

Embodiment 8 relates to a method of forming a film with a bridged silicone resin. The method of Embodiment 8 comprises:

applying the bridged silicone resin to a substrate; and forming the film from the bridged silicone resin on the substrate;

wherein the bridged silicone resin is the bridged silicone resin of any one of Embodiments 1-3.

Embodiment 9 relates to the method of Embodiment 8, wherein applying the bridged silicone resin comprises applying a silicone composition comprising the bridged silicone resin and a vehicle.

Embodiment 10 relates to the method of Embodiments 8 or 9, wherein the bridged silicone resin is applied by i) spin coating; ii) brush coating; iii) drop coating; iv) spray coating; v) dip coating; vi) roll coating; vii) flow coating; viii) slot coating; ix) gravure coating; or x) a combination of any of i) to ix).

Embodiment 11 relates to the method of Embodiment 9, further comprising spinning the silicone composition on the substrate to form a spinned layer on the substrate; and annealing the spinned layer to form the film on the substrate.

Embodiment 12 relates to a film formed in accordance with the method of any of Embodiments 8-11.

Embodiment 13 relates to the film of Embodiment 12 having a thickness of from greater than 0 to 10 microns.

Embodiment 14 relates to the film of Embodiments 12 or 13, which substantially resists cracking when heated to a temperature of i) from 100 to 1000° C.; ii) from 400 to 850° C.; or iii) both i) and ii).

Embodiment 15 relates to an electronic device, comprising:

an electronic component; and a film disposed adjacent the electronic component;

wherein the film is the film of any one of Embodiments 12-14.

Embodiment 16 relates to use of the electronic device of Embodiment 15.

Embodiment 17 relates to a method of insulating an electronic device which comprises an electronic component and a film disposed adjacent the electronic component. The method of Embodiment 17 comprises:

powering the electronic device such that the electronic component has an elevated temperature of from greater than 20° C. to 1,000° C.;

wherein the film is the film of any one of Embodiments 12-14;

wherein the film insulates the electronic component and exhibits substantial resistance to cracking at the elevated temperature.

The electrical component of the electronic device is typically a semiconducting component, alternatively a conducting component. The film has excellent dielectric properties and may insulate such semiconducting components from heat and/or electric current. However, the electrical component may be any component of the electrical device, which are well known. The heat may be attributable to an environment or ambient conditions in which the electrical device is utilized. Alternatively, the heat may be attributable to use and powering of the electronic device, which generally results in the generation of heat at least in various electrical components of the electrical device, particularly electrically conductive components thereof.

A method of insulating the electronic device is also provided. The method comprises powering the electronic device such that the electronic component has an elevated temperature of from greater than 20° to 1,000° C. The film insulates the electronic component and exhibits substantial resistance to cracking at the elevated temperature as described above. Because of the excellent dielectric properties of the film, insulation typically extends to both insulation from heat at the elevated temperature and to insulation from electrical current when powering the electronic device.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

EXAMPLES

Bridged silicone resins in accordance with the present invention are prepared below. Before preparing the bridged silicone resins, certain bridging compounds are first prepared.

Preparation Example 1: Bridging Compound 1

A bridging compound (bridging compound 1) is produced via a Grignard reaction. In particular, 100 grams of p-dibromobenzene, 10 grams of magnesium, and 400 grams of diethylether are disposed in a flask to form a mixture. The mixture is heated to reflux, held at reflux for 6 hours, and then cooled to room temperature. 56.3 grams of vinyldimethylchlorosilane are disposed into the flask and the contents of the flask are stirred for 2 hours. Any volatiles are removed from the flask using a rotary evaporator to leave a concentrate. The concentrate is then purified by vacuum distillation to isolate the bridging compound 1, which is 4-bis(vinyldimethylsilyl)benzene.

Preparation Example 2: Bridging Compound 2

A second bridging compound (bridging compound 2) is produced via a Grignard reaction. In particular, 100 grams of dibromophenoxy, 10 grams of magnesium, and 400 grams of diethylether are combined in a flask to form a mixture. The mixture is heated to reflux, held at reflux for 12 hours, and then cooled to room temperature. 40.5 grams of vinyldimethylchlorosilane are added to the flask and the contents of the flask are stirred for 2 hours. Any volatiles are removed from the flask using a rotary evaporator to leave a concentrate. The concentrate is then purified by vacuum distillation to isolate the bridging compound 2, which is 4-bis(vinyldimethylsilyl)phenoxybenzene.

Practical Example 1

A bridged silicone resin (bridged silicone resin 1) is produced in accordance with the present invention.

Specifically, 100 grams of a hydrogen silsesquioxane resin (molecular weight of 12,000; 32.0% by weight in toluene), 3.2 grams of bridging compound 1, and 0.01 grams of Karsetedt's platinum (Pt) catalyst are combined in a flask to form a mixture. The mixture is heated to reflux and stirred at reflux for 48 hours to form a silicone resin mixture. The silicone resin mixture is then cooled to 60° C., and 5 grams of active carbon are disposed in the flask to form a suspension. The suspension is then filtered and the filtrate is solvent exchanged with propylene glycol monomethyl ether acetate (PGMEA) using a rotary evaporator to a form a 20% by weight in PGMEA solution of the bridged silicone resin 1. The bridged silicone resin 1 has the general formula $(HSiO_{3/2})_x(SiO_{3/2}-CH_2CH_2-SiMe_2-C_6H_4-SiMe_2-CH_2CH_2-SiO_{3/2})_y$, where x is 0.979, y is 0.021, and Me indicates a methyl group.

Practical Example 2

A bridged silicone resin (bridged silicone resin 2) is produced in accordance with the present invention.

Specifically, 100 grams of a hydrogen silsesquioxane resin (molecular weight of 12,000; 32.0% by weight in toluene), 1.6 grams of bridging compound 1, and 0.01 grams of a platinum (Pt) catalyst are combined in a flask to form a mixture. The mixture is heated to reflux and stirred at reflux for 48 hours to form a silicone resin mixture. The silicone resin mixture is then cooled to 60° C., and 5 grams of active carbon are disposed in the flask to form a suspension. The suspension is then filtered and the filtrate is solvent exchanged with propylene glycol monomethyl ether acetate (PGMEA) using a rotary evaporator to a form a 20% by weight in PGMEA solution of the bridged silicone resin 2. The bridged silicone resin 2 has the general formula $(HSiO_{3/2})_x(SiO_{3/2}-CH_2CH_2-SiMe_2-C_6H_4-SiMe_2-CH_2CH_2-SiO_{3/2})_y$, where x is 0.989, y is 0.011, and Me indicates a methyl group.

Practical Example 3

A bridged silicone resin (bridged silicone resin 3) is produced in accordance with the present invention.

Specifically, 100 grams of a hydrogen silsesquioxane resin (molecular weight of 12,000; 32.0% by weight in toluene), 3.2 grams of bridging compound 2, and 0.01 grams of a platinum (Pt) catalyst are combined in a flask to form a mixture. The mixture is heated to reflux and stirred at reflux overnight to form a silicone resin mixture. The silicone resin mixture is then cooled to 60° C., and active carbon is disposed in the flask to form a suspension include 10 wt. % active carbon. The suspension is then filtered and the filtrate is solvent exchanged with propylene glycol monomethyl ether acetate (PGMEA) using a rotary evaporator to a form a 20% by weight in PGMEA solution of the bridged silicone resin 3. The bridged silicone resin 3 has the general formula $(HSiO_{3/2})_x(SiO_{3/2}-CH_2CH_2-SiMe_2-C_6H_4-O-C_6H_4-SiMe_2-CH_2CH_2-SiO_{3/2})_y$, where x is 0.983, y is 0.017, and Me indicates a methyl group.

Practical Example 4

A bridged silicone resin (bridged silicone resin 4) is produced in accordance with the present invention.

Specifically, 100 grams of a hydrogen silsesquioxane resin (molecular weight of 12,000; 32.2% by weight in toluene), 2 grams of bridging compound 3 (hydroxyl-terminated phenylmethyl organopolysiloxane, having an average degree of polymerization (DP) of 4), and 0.2 grams of 4-ethyl morpholine are combined in a flask to form a mixture. The mixture is heated to 60° C. and stirred for 12 hours. 2.0 grams of acetic acid are disposed in the flask to give a silicone resin mixture. The silicone resin mixture is then washed with deionized water and solvent exchanged with propylene glycol monomethyl ether acetate (PGMEA) using a rotary evaporator to a form a 20% by weight in PGMEA solution of the bridged silicone resin 4. The bridged silicone resin 4 has the general formula $(HSiO_{3/2})_x(SiO_{3/2}-(SiPhMeO)n-SiO_{3/2})_y$, where x is 0.992, y is 0.008, Me indicates a methyl group, Ph indicates a phenyl group, and n is 4.

Film Coating and Characterization

The PGMEA solutions of bridged silicone resins formed in Practical Examples 1-4 may be utilized to form films on substrates, and in particular on wafers. The particular PGMEA solution is filtered through a 0.2 millimeter (mm) TEFLON™ filter and then spin coated onto standard single side four inch polished low resistivity wafers or double sided polished Fourier Transform Infrared Spectroscopy (FTIR wafers via a Karl Suss CT62 spin coater, commercially available from SUSS MicroTec Inc. of Corona, Calif.), to give a spinned film. The PGMEA solution and concentration of bridged silicone resin therein, as well as the selected revolutions per minute of the spin coater, may be selected based on desired thickness of the film. The spinned film is soft-baked at 180° C. for 60 seconds using a rapid thermal processing (RTP) oven with a nitrogen gas purge to give a baked film. The baked film is then annealed at 350° C., 450° C., 550° C., 650° C., or 800° C. for 60 minutes under nitrogen to give the film. After the annealing, the wafer and film are cooled to room temperature and then inspected using optical microscope for cracking. The thickness of the film is determined using a J. A. Woollam ellipsometer or a profilemeter, commercially available from J. A. Woollam Co. of Lincoln, Nebr.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A bridged silicone resin having the general formula (1):

$$(HSiO_{3/2})_x(SiO_{3/2}-X-SiO_{3/2})_y \quad (1)$$

wherein x and y are each from >0 to <1 such that x+y=1; and wherein X is divalent group comprising a silarylene group.

2. The bridged silicone resin of claim 1, wherein X has the general formula (2):

$$-(CH_2)_q-SiRR^1-X'-SiRR^1-(CH_2)_{q'}- \quad (2)$$

wherein q and q' are each independently integers selected from 2 to 6; each R and $R^1$ is an independently selected substituted or unsubstituted hydrocarbyl group; and X' is a divalent linking group comprising an arylene group.

3. The bridged silicone resin of claim 2, wherein X' has the general formula (3):

$$-(C_{6-k}H_{4-k}Y_k)-[(Z)_r-(C_{6-k'}H_{4-k'}Y'_{k'})]_p- \quad (3)$$

wherein p is an integer selected from 0 or from 1 to 3, r is 0 or 1, k and each k' are independently integers selected from 0 or from 1 to 4, Y and each Y' are independently selected from N, O, and S, and each Z is independently selected from O, S, $SiR^2_2$, CO, $CR^2_2$, $SO_2$, $PO_2$ and $NR^2$, where each $R^2$ is independently H or a substituted or unsubstituted hydrocarbyl group.

4. A method of preparing the bridged silicone resin of claim 1, said method comprising:
reacting an initial silicone resin and a bridging compound to give the bridged silicone resin;
wherein the initial silicone resin and has the general formula $(HSiO_{3/2})_{n'}$, where n' is 1; and
wherein the bridging compound has the general formula (4):

$$R^3-Z'-R^3 \quad (4)$$

wherein each $R^3$ independently is a functional group reactive with the silicon-bonded hydrogen atoms of the initial silicone resin, and Z' comprises an arylene group.

5. The method of claim 4, wherein Z' has the general formula (5):

$$-SiRR^1-X'-SiRR^1- \quad (5)$$

wherein each R and $R^1$ is an independently selected substituted or unsubstituted hydrocarbyl group; and X' is a divalent linking group having the general formula (3):

$$-(C_{6-k}H_{4-k}Y_k)-[(Z)_r-(C_{6-k'}H_{4-k'}Y'_{k'})]_p- \quad (3)$$

wherein p is an integer selected from 0 or from 1 to 3, r is 0 or 1, k and each k' are independently integers selected from 0 or from 1 to 4, Y and each Y' are independently
selected from N, O, and S, and each Z is independently selected from 0, S, $SiR^2_2$, CO, $CR^2_2$, $SO_2$, $PO_2$ and $NR^2$, where each $R^2$ is independently H or a substituted or unsubstituted hydrocarbyl group.

6. The method of claim 4, wherein reacting the initial silicone resin and the bridging compound comprises (i) a hydrosilylation reaction; (ii) a condensation reaction; or (iii) a combination of (i) and (ii).

7. A method of forming a film with a bridged silicone resin, said method comprising:
applying the bridged silicone resin to a substrate; and
forming the film from the bridged silicone resin on the substrate;
wherein the bridged silicone resin is the bridged silicone resin of claim 1.

8. The method of claim 7, wherein the bridged silicone resin is applied by i) spin coating; ii) brush coating; iii) drop coating; iv) spray coating; v) dip coating; vi) roll coating; vii) flow coating; viii) slot coating; ix) gravure coating; or x) a combination of any of i) to ix).

9. The method of claim 7, further comprising:
spinning the silicone composition on the substrate to form a spinned layer on the substrate; and annealing the spinned layer to form the film on the substrate.

10. A film formed in accordance with the method of claim 7.

11. The film of claim 10 having a thickness of from greater than 0 to 10 micrometers.

12. The film of claim 10 which substantially resists cracking when heated to a temperature of i) from 100 to 1000° C.; ii) from 400 to 850° C.; or iii) both i) and ii).

13. An electronic device, comprising:
   an electronic component; and
   a film disposed adjacent the electronic component;
   wherein the film is the film of claim 10.

14. A method of insulating an electronic device which comprises an electronic component and a film disposed adjacent the electronic component, said method comprising:
   powering the electronic device such that the electronic component has an elevated temperature of from greater than 20° C. to 1,000° C.;
   wherein the film is the film of claim 10; and
   wherein the film insulates the electronic component and exhibits substantial resistance to cracking at the elevated temperature.

* * * * *